Patented July 5, 1949

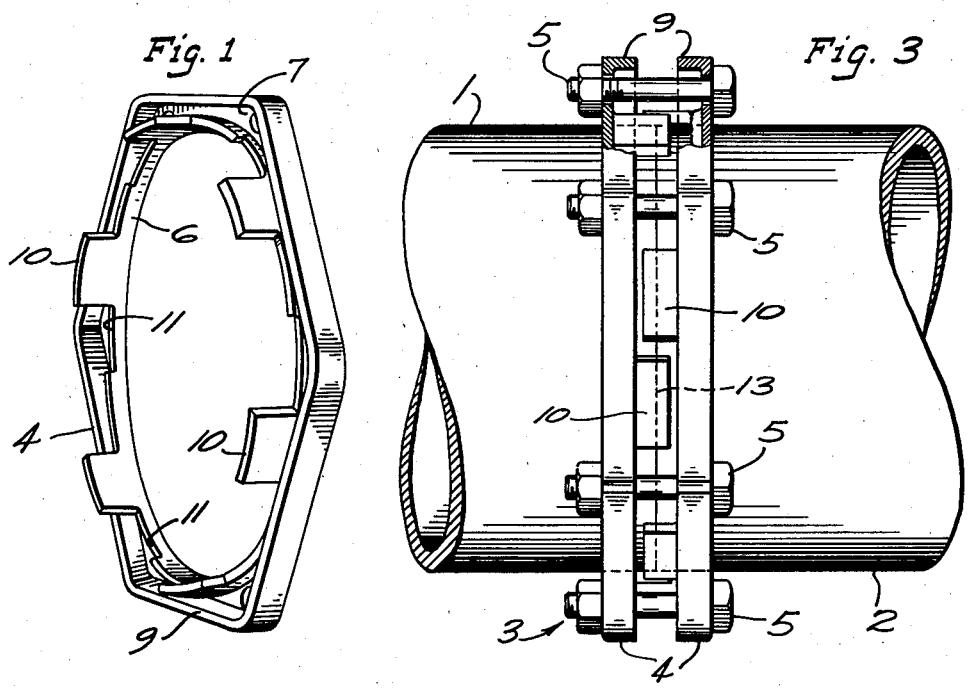
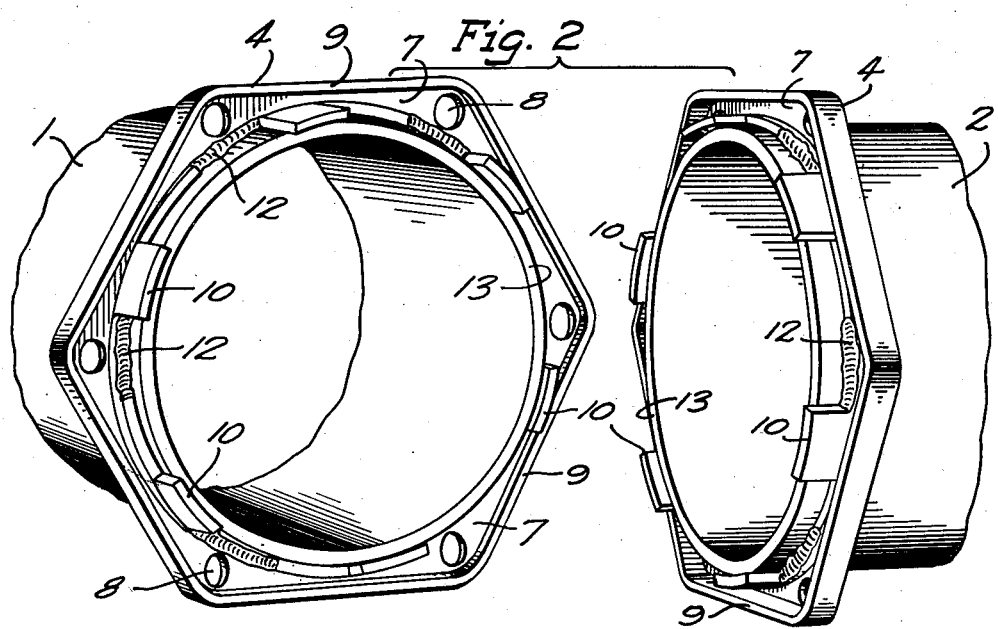

2,475,057

UNITED STATES PATENT OFFICE 2,475,057

COUPLING

Neil B. Shaber, Los Angeles, Calif., assignor to A. O. Smith Corporation, Milwaukee, Wis., a corporation of New York Application January 25, 1946, Serial No. 643,280

4 Claims. (Cl. 285—137)

This invention relates to a coupling and has particular reference to a joint for large size pipe such as may be employed for the discharge column of deep well turbine pumps.

Heretofore in coupling large size columns the usual practices required a number of expensive machining operations by large and expensive machines and the employment of special centering rings.

One object of the invention is to provide a coupling for a pipe joint under which leakage surfaces are substantially decreased.

Another object is to provide a coupling in which a separate centering ring is eliminated.

Another object is to provide a flanged coupling for pipe in which the flange holds the sections together in a fluid tight joint as well as centering the same.

Another object is to provide a less expensive coupling between pipe sections by decreasing machining operations and avoiding the requirement of a separate centering ring.

Another object is to provide a generally light weight flanged joint of substantial strength between pipe sections.

These and othed objects of the invention will appear hereinafter in connection with the following description of an embodiment of the invention illustrated in the accompanying drawing.

In the drawing:

Figure 1 is a perspective view of a flange before assembly on a pipe;

Fig. 2 is a perspective view of a pair of pipe sections with flanges secured thereto and with the sections ready for assembly together; and Fig. 3 is an elevational view showing a pair of pipe sections coupled together by the flanges of the invention.

Referring to the drawings there is illustrated a pair of pipe sections 1 and 2 joined together by a coupling 3 comprising a flange 4 secured to pipe section 1 and a similar flange 4 secured to pipe section 2 and joined together by a plurality of bolts 5 to disposed edges of the respective pipe sections together end to end in a fluid tight joint and in axial alignment.

The flanges 4 are identical and only one of the flanges will be described.

Each flange 4 has a ring 6 slightly greater in dimensions than the outer circumference of the pipe over which the flange is to be slipped. The ring 6 is surrounded by an integrally formed web 7 which extends radially therefrom a short distance. The outer periphery of the web is preferably of polygonal shape to lighten the weight of the flange 4 and provide a plurality of equally spaced corner areas for the bolt holes 8.

The web 7 is bordered on the outside with the horizontal flange 9 which extends inwardly towards the pipe end from the web and gives greater rigidity to the structure.

A plurality of equally spaced lugs 10 constituting extensions of ring 6 project axially from the inner edge of the ring a sufficient distance to extend across the joint.

The lugs 10 are offset from the center line between bolt holes 8 to the left of the center line as shown to permit interlock of the lugs when a pair of flanges 4 are assembled together. The ring 6 is formed or cast with a recess 11 to the one side of each lug 10, preferably beneath the respective bolt holes 8, to provide a seat for the weld metal 12.

The welds 12 secure the flange 4 to the respective pipe section 1 or 2 with which the flange is assembled and are normally made by the electric arc deposit of weld metal. The weld metal is deposited along the edge portions of circumferentially spaced recesses 11 of ring 6 to securely join the flange and pipe section together.

The meeting faces 13 of pipe sections 1 and 2 are accurately mated to provide a metal to metal contact seal at the joint therebetween. Where the sections are employed as a discharge column in deep well turbine pumps pipe sections of the length desired are cut in an ordinary pipe cutting machine. The metal to metal contact desired is obtained without employing a special machine to reface the meeting surfaces of the sections before assembly together.

One of the flanges 4 is slipped over the end of pipe section 1 and welded thereto by deposit of weld metal 12 at the inwardly formed edge portions of recesses 11 of ring 6. The other flange 4 is assembled on the mating end of pipe section 2 and similarly welded thereto.

The flanges 4, as finally assembled and secured on their respective pipe sections are in a position removed from the end of the section and with the lugs 10 extending axially outwardly from the section a slight distance.

Fig. 2 illustrates a pair of flanges 4 welded to pipe sections 1 and 2 preparatory to assembly of the sections together.

The pipe sections 1 and 2 are next axially aligned and faces 13 thereof are brought together in a metal to metal contact with the lugs 10 of each respective pipe section in interlocking relation and overlying the circumferential surface of the adjacent section of pipe. Bolts 5 are then inserted into bolt holes 8 and tightened up to join the two sections of pipe together as illustrated in Fig. 3.

In final assembled position there is a metal to metal contact seal at the point between pipe sections 1 and 2 and the lugs 10 provide an interrupted centering ring across the joint of the pipe sections. The lugs 10 maintain the pipe sections 1 and 2 in axial alignment in service and the coupling 3 holds the sections securely together with a sealed joint therebetween.

The flanges of the invention are light and strong and readily welded to the pipe sections. Centering of the pipe sections to be joined together is accomplished without the use of a separate ring and leakage surfaces are substantially eliminated.

Other shapes of couplings than that described may be employed. The lugs on the respective flanges thereof should be offset from the center line between bolt holes so that all flanges may be fabricated alike but assembled with the lugs in interlocked relation.

Various embodiments of the invention may be employed within the scope of the accompanying claims.

I claim:

1. A coupling for joining a pair of pipe sections and the like together in axial alignment, comprising a flange member disposed at an end of the one section to be joined and a similar flange member disposed at an end of the other section to be joined, lugs extending axially from each flange and engaging the circumferential surface of the end portion of the adjacent pipe section and overlying the same for a substantial distance in alternate circumferentially spaced relation with each other to provide an interrupted centering ring around the circumferential joint between said sections, and means to secure the flanges together to hold the pipe sections in a metal to metal contact at their meeting ends and seal the circumferential joint against leakage.

2. A coupling for joining a pair of pipe sections and the like together in axial alignment, comprising a flange member welded adjacent an end of the one section to be joined and a similar flange member welded adjacent an end of the other section to be joined, a plurality of circumferentially spaced lugs extending axially from each flange and engaging the circumferential surface of the end portion of the adjacent pipe section and overlying the same for a substantial distance in alternate circumferentially spaced relation with each other to provide an interrupted centering means around the circumferential joint between said sections, and bolts extending through said flanges to hold the pipe sections in a metal to metal contact at their meeting ends and seal the circumferential joint against leakage.

3. A coupling for joining a pair of pipe sections and the like together in axial alignment, comprising a flange member of channel section welded adjacent an end of the one section to be joined, said flange comprising a ring having an opening of sufficient dimensions to slip over the end of the section with a web extending radially outwardly from the ring and bordered by a stiffening flange around the outer polygonally shaped outer edge thereof, a similar flange member welded adjacent the end of the other section to be joined, a plurality of circumferentially spaced lugs extending axially from the ring of each flange and closely overlying the surface of the adjacent pipe section in alternate circumferentially spaced relation with each other to provide an interrupted centering ring around the circumferential joint between said sections, and bolts extending through the corner areas of the polygonally shaped web to hold the sections in a metal to metal contact at their meeting ends and seal the circumferential joint against leakage.

4. A coupling for joining a pair of pipe sections and the like together in axial alignment, comprising a flange member formed of a ring having an opening of sufficient dimensions to slip over the end of the section with a web extending radially outwardly from the ring and bordered by a stiffening flange around the polygonally shaped outer edge thereof to form a band of generally channel cross-section opening toward the end of the pipe, a plurality of circumferentially spaced welds opposite the corner areas of the polygonally shaped web joining the flange to one pipe section adjacent the end thereof, a similar flange member similarly welded to the other pipe section adjacent an end thereof, a plurality of circumferentially spaced lugs extending axially from the ring of each flange and offset from each other between corner areas of the polygonally shaped web and tightly overlying the surface of the adjacent pipe section in alternate relation with each other to provide an interrupted centering ring around the circumferential joint between the sections, and means to secure the flanges together to hold the pipe sections in a metal to metal contact at their meeting ends and seal the circumferential joint against leakage.

NEIL B. SHABER.

REFERENCES CITED

The following references are of record in the file of this patent:

UNITED STATES PATENTS

| Number | Name | Date |
| --- | --- | --- |
| 1,499,962 | Barnes | July 1, 1924 |
| 1,514,052 | Kaiser | Nov. 4, 1924 |
| 1,607,254 | Fantz | Nov. 16, 1926 |
| 1,817,289 | Bentz | Aug. 4, 1931 |
| 1,986,419 | Taylor | Jan. 1, 1935 |
| 2,255,634 | Walsh | Sept. 9, 1941 |